(12) United States Patent  
Bell et al.

(10) Patent No.: US 8,186,964 B2
(45) Date of Patent: May 29, 2012

(54) SPAR ASSEMBLY FOR A WIND TURBINE ROTOR BLADE

(75) Inventors: Eric Lee Bell, Greenville, SC (US); Jamie Livingston, Simpsonville, SC (US); Matthew G. Gann, Greenville, SC (US); Brandon Shane Gerber, Charleston, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/964,877

(22) Filed: Dec. 10, 2010

(65) Prior Publication Data

US 2011/0206529 A1      Aug. 25, 2011

(51) Int. Cl.
    *F03D 11/02*          (2006.01)
(52) U.S. Cl. .................. 416/226; 416/230; 416/233
(58) Field of Classification Search .................. 416/226, 416/232, 229 R, 230, 240, 132 B, 233; 244/123.1, 244/123.14, 123.8, 123.9

See application file for complete search history.

(56) References Cited

U.S. PATENT DOCUMENTS

| 2,465,007 | A | * | 3/1949 | Bragdon et al. | 416/144 |
| 2,981,337 | A | * | 4/1961 | Stuart, III | 416/226 |
| 3,013,614 | A | * | 12/1961 | Platt | 416/225 |
| 4,079,903 | A | * | 3/1978 | Ashton et al. | 244/123.5 |
| 4,895,491 | A | * | 1/1990 | Cross et al. | 416/224 |
| 5,127,802 | A | * | 7/1992 | Carlson et al. | 416/226 |
| 2008/0310964 | A1 | | 12/2008 | Llorente Gonzalez et al. | |
| 2009/0196755 | A1 | * | 8/2009 | Peace et al. | 416/226 |

FOREIGN PATENT DOCUMENTS

EP     1808598        7/2007
WO     WO 2006/064077  6/2006

* cited by examiner

*Primary Examiner* — Edward Look
*Assistant Examiner* — Aaron R Eastman
(74) *Attorney, Agent, or Firm* — Dority & Manning, P.A.

(57) ABSTRACT

A spar assembly for a rotor blade of a wind turbine is disclosed. The spar assembly may generally include a first spar cap and a second spar cap spaced apart from the first spar cap such that a cross-sectional area is defined directly between the first and second spar caps. Additionally, the spar assembly may include a web having a first end disposed adjacent to the first spar cap and a second end disposed adjacent to the second spar cap. The web may be configured such that at least a portion of an inner surface of the web is disposed outside of the cross-sectional area.

16 Claims, 5 Drawing Sheets

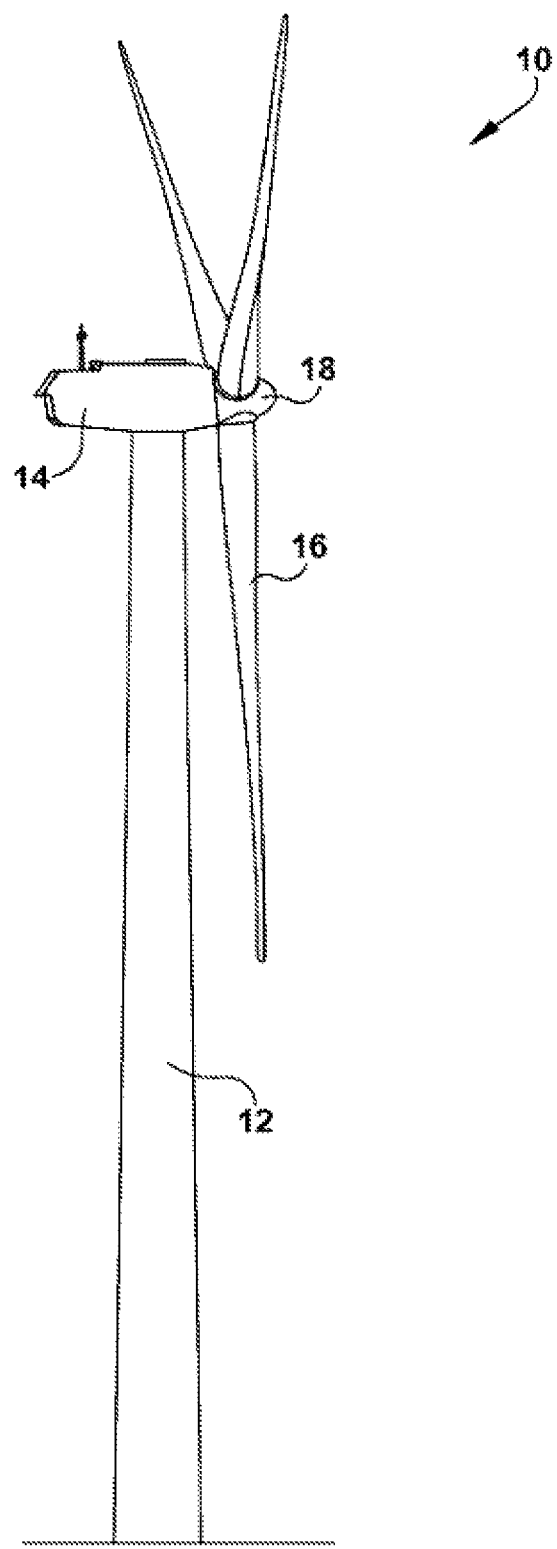
FIG. -1-

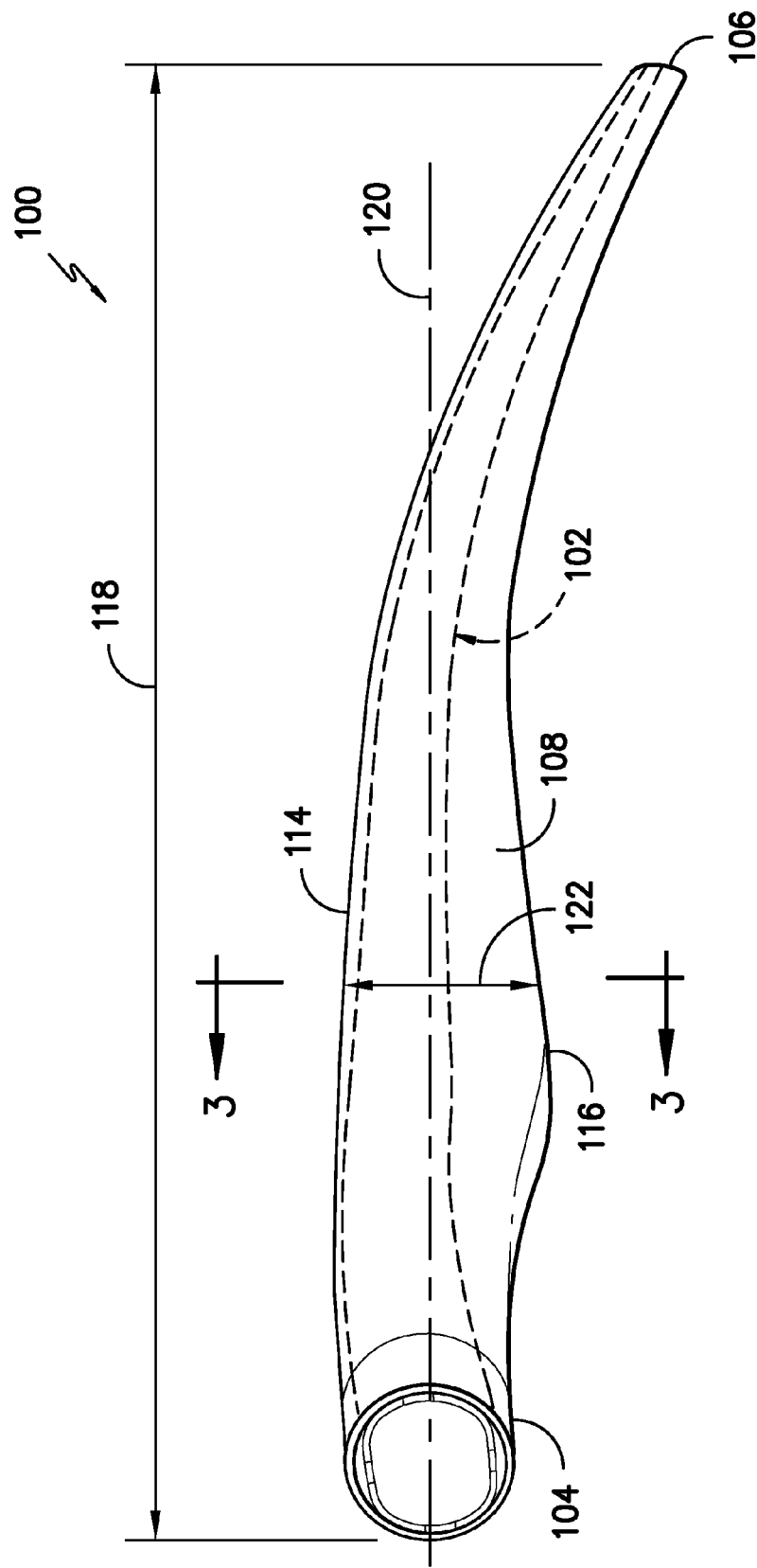
FIG. -2-

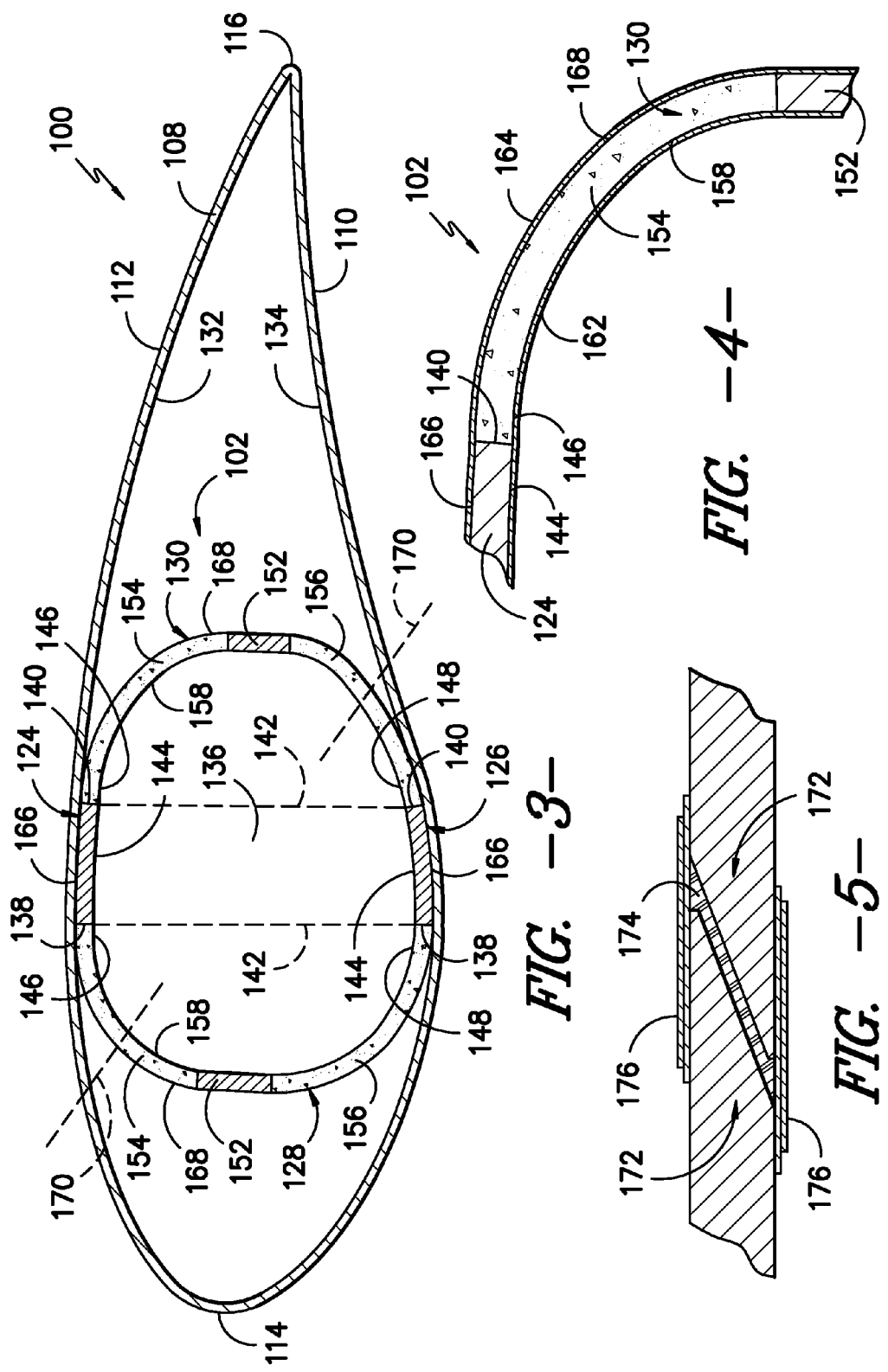

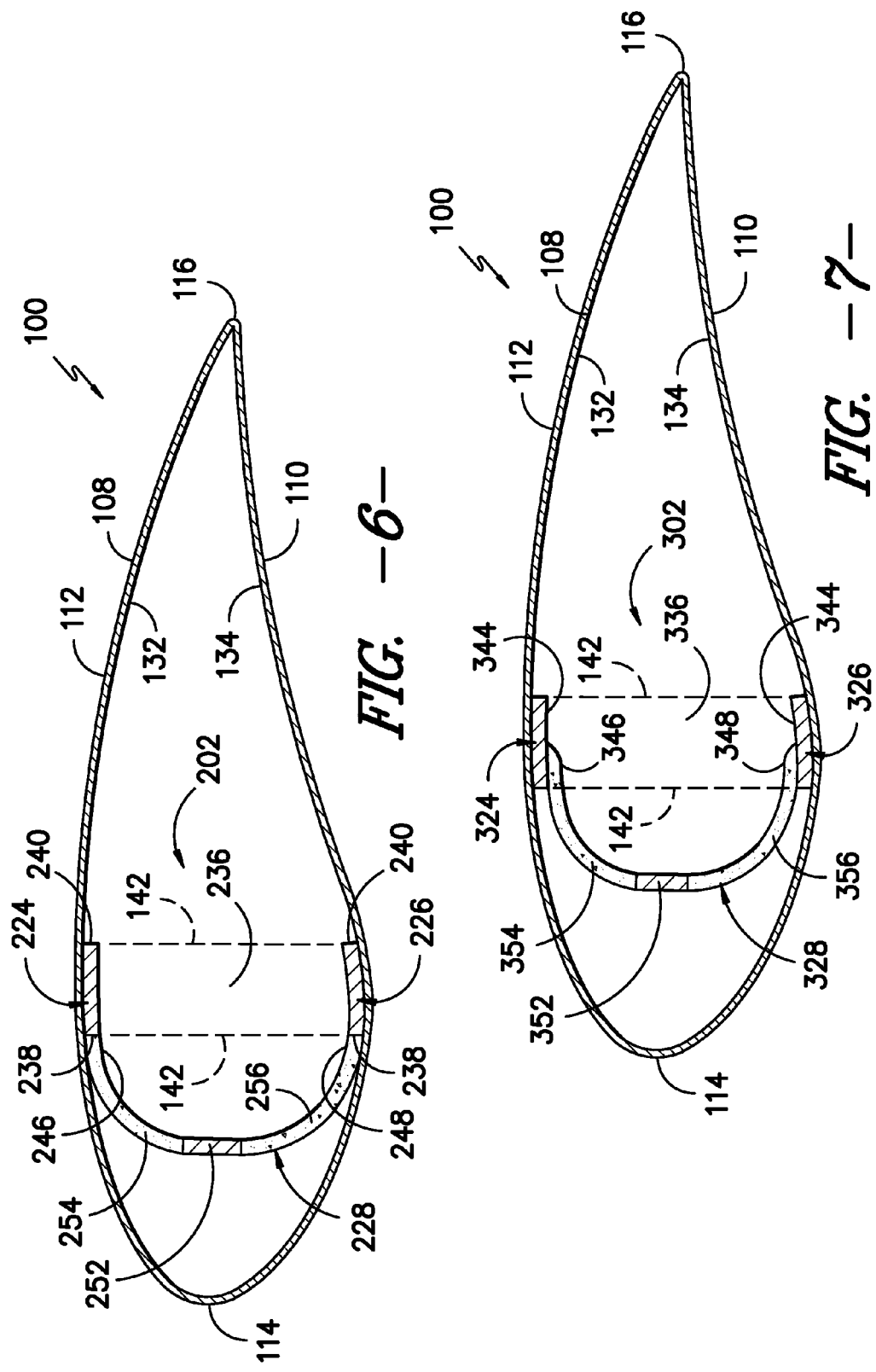

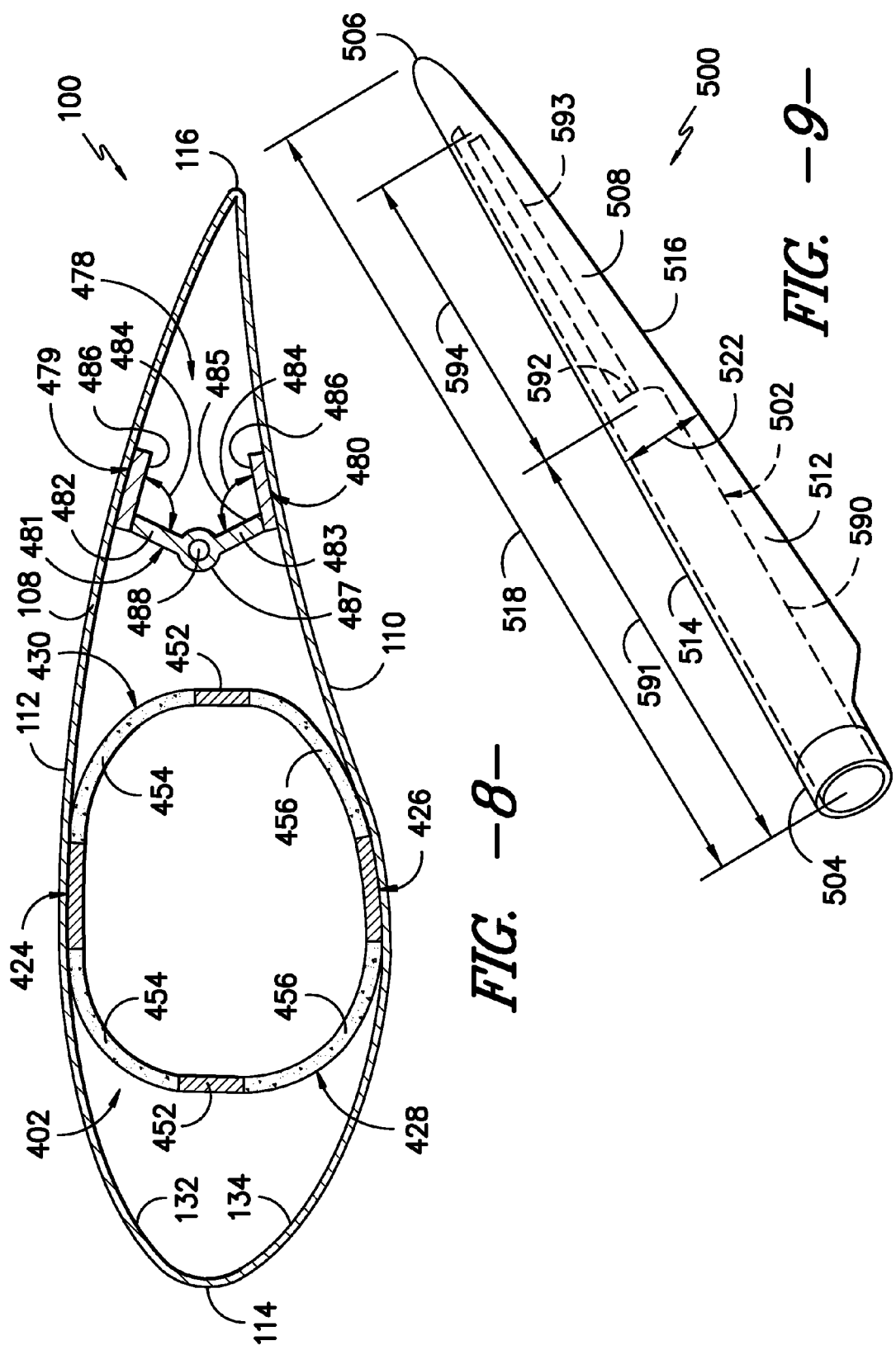

SPAR ASSEMBLY FOR A WIND TURBINE ROTOR BLADE

FIELD OF THE INVENTION

The present subject matter relates generally to wind turbines and, more particularly, to a spar assembly for a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Conventional rotor blades typically include a shell formed from two shell halves coupled together along corresponding edges of the rotor blade. The shell halves and, thus, the shell are relatively lightweight and have insufficient structural properties (e.g., stiffness and strength) to withstand the bending moments and other loads exerted on the rotor bade during operation. Thus, the shell is typically reinforced using a spar assembly consisting of a pair of opposed spar caps and a shear web extending perpendicularly between the opposed spar caps. This conventional spar configuration generally provides a rotor blade with a relatively high, constant stiffness.

To ensure that wind power remains a viable energy source, efforts have been made to improve the overall performance of wind turbines by modifying the size, shape and configuration of wind turbine rotor blades. One such modification has been to aero-elastically tailor rotor blades in order to take advantage of the bending and/or twisting that occurs on a rotor blade during operation of wind turbine. However, to fully appreciate such advantages, aero-elastically tailored rotor blades generally require a support structure that is capable of shedding the aerodynamic loads acting on the blade. Unfortunately, conventional spar assemblies are poor at providing the proper load alleviation needed to accommodate such loads.

Accordingly, there is a need for a spar assembly that can provide the increased load alleviation needed for aero-elastically tailored rotor blades.

BRIEF DESCRIPTION OF THE INVENTION

Aspects and advantages of the invention will be set forth in part in the following description, or may be obvious from the description, or may be learned through practice of the invention.

In one aspect, the present subject matter discloses a spar assembly for a rotor blade of a wind turbine. The spar assembly may generally include a first spar cap and a second spar cap spaced apart from the first spar cap such that a cross-sectional area is defined directly between the first and second spar caps. Additionally, the spar assembly may include a web having a first end disposed adjacent to the first spar cap and a second end disposed adjacent to the second spar cap. The web may be configured such that at least a portion of an inner surface of the web is disposed outside of the cross-sectional area.

In another aspect, the present subject matter discloses a spar assembly for a rotor blade of a wind turbine. The spar assembly may generally include a first spar cap and a second spar cap spaced apart from the first spar cap. Additionally, the spar assembly may include a hinged web having a first end disposed adjacent to said first spar cap and a second end disposed adjacent to said second spar cap.

In a further aspect, the present subject matter discloses a rotor blade for a wind turbine. The rotor blade generally includes a shell including a first interior surface and a second interior surface disposed opposite of the first interior surface. The rotor blade may also include a spar assembly having a first spar cap and a second spar cap spaced apart from the first spar cap such that a cross-sectional area is defined directly between the first and second spar caps. Additionally, the spar assembly may include a web having a first end disposed adjacent to the first spar cap and a second end disposed adjacent to the second spar cap. The web may be configured such that at least a portion of an inner surface of the web is disposed outside of the cross-sectional area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a perspective view of one embodiment of a rotor blade having a spar assembly disposed therein in accordance with aspects of the present subject matter;

FIG. 3 illustrates a cross-sectional view of the rotor blade and spar assembly shown in FIG. 2;

FIG. 4 illustrates a cross-sectional view of a portion of the spar assembly shown in FIG. 3;

FIG. 5 illustrates a cross-sectional view of a joint configuration that may be utilized with the disclosed spar assembly in accordance with aspects of the present subject matter;

FIG. 6 illustrates a cross-sectional view of another embodiment of a rotor blade having a spar assembly disposed therein in accordance with aspects of the present subject matter;

FIG. 7 illustrates a cross-sectional view of yet another embodiment of a rotor blade having a spar assembly disposed therein in accordance with aspects of the present subject matter;

FIG. 8 illustrates a cross-sectional view of one embodiment of a rotor blade having a primary spar assembly and an auxiliary spar assembly disposed therein in accordance with aspects of the present subject matter; and, FIG. 9 illustrates a perspective view of another embodiment of a rotor blade having a spar assembly disposed therein in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a spar assembly configured to serve as the primary structural element of a wind turbine rotor blade. Thus, the spar assembly may generally be configured to carry the aerodynamic and inertial (or primary) loads acting on the rotor blade, such as flapwise, edgewise and/or torsional loads. Additionally, spar assembly may be configured to provide increased load alleviation and deflection control to the rotor blade. For example, in several embodiments, the spar assembly may include one or more curved shear webs configured to reduce the stiffness of the rotor blade by providing tunable stiffness to the blade. In other embodiments, the spar assembly may include a hinged shear web configured to provide a controlled increase in the deflection of the rotor blade.

It should be appreciated that the disclosed spar assembly may generally provide numerous advantages for a wind turbine rotor blade. For example, by configuring the spar assembly to carry the primary loads acting on the rotor blade, the structural components of the blade may be completely divorced from the rotor blade's skin or shell, which may route local aerodynamic loads to the spar assembly. As such, the shell may be designed as a non-load bearing component of the rotor blade. This may allow the overall thickness of the shell to be reduced significantly, resulting in both a mass and a material cost reduction.

Additionally, by divorcing the structural components from the shell, the disclosed spar assembly may be independently tailored to accommodate blade loading, thereby providing increased design flexibility. For instance, the shape, dimensions, materials and/or other features of the components of the spar assembly may be specifically tailored to provide a rotor blade with a particular set of structural properties. This increased tuning capability of the spar assembly may be particularly advantageous for tailoring and/or controlling the blade displacement/blade stiffness and twist of a rotor blade. For example, aero-elastically tailored rotor blades generally require an increased ability to shed aerodynamic loads. Thus, the disclosed spar assembly may be installed within an aero-elastically tailored rotor blade to allow the blade's structural properties to be finely tuned. Specifically, the spar assembly may be configured to provide variable stiffness to the rotor blade, thereby improving the rotor blade's ability to alleviate aerodynamic loads acting on the blade and enhancing the blade's ability to accommodate twisting. For example, in several embodiments, the spar assembly may include one or more curved shear webs exhibiting variable spring rates through their curvature to allow the spar assembly to flex or otherwise provide a dynamic response to blade loading.

Referring now to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIGS. 2-4, there is illustrated embodiments of a rotor blade 100 and a spar assembly 102 in accordance with aspects of the present subject matter. In particular, FIG. 2 illustrates a perspective view of the rotor blade 100 with the spar assembly 102 being disposed therein. FIG. 3 illustrates a cross-sectional view of the rotor blade 100 shown in FIG. 2. Additionally, FIG. 4 illustrates a cross-sectional view of a portion of the spar assembly 102 shown in FIG. 3.

As shown, the rotor blade 100 may generally include a blade root 104 configured for mounting the rotor blade 10 to the hub 18 of a wind turbine 10 (FIG. 1) and a blade tip 106 disposed opposite the blade root 104. The rotor blade 100 may also include a shell 108 extending between the blade root 104 and the blade tip 106. The shell 108 may generally serve as the outer skin of the rotor blade 100 and, thus, may define a substantially aerodynamic profile. For instance, the shell 108 may be configured to have an airfoil-shaped cross-section, such as by being configured as symmetrical airfoil or a cambered airfoil and may define a pressure side 110 and a suction side 112 extending between leading and trailing edges 114, 116. Further, the rotor blade 100 may also have a span 118 defining the length of the blade along its central axis 120 between the blade root 104 and the blade tip 106 and a chord 122 defining the length of the blade 100 between the leading edge 114 and the trailing edge 116. As is generally understood, the chord 122 may generally vary in length with respect to the span 118 as the rotor blade 100 extends from the blade root 104 to the blade tip 106.

It should be appreciated that, in one embodiment, the shell 108 of the rotor blade 100 may be formed as a single, unitary component. Alternatively, the shell 108 may be formed from a plurality of shell components. For example, the shell 108 may be manufactured from a first shell half generally defining the pressure side 110 of the rotor blade 100 and a second shell half generally defining the suction side 112 of the rotor blade 100, with such shell halves being secured to one another at the leading and trailing edges 114, 116 of the blade 100. Additionally, the shell 108 may generally be formed from any suitable material. For instance, in several embodiments, the shell 108 may be formed from a composite laminate material, such as a carbon fiber-reinforced composite or a glass fiber-reinforced composite.

Additionally, in several embodiments, the shell 108 may be aero-elastically tailored in order to accommodate and/or take advantage of the bending and/or twisting of the rotor blade 100 that occurs during operation of the wind turbine (FIG. 1). Thus, in one embodiment, the shell 108 may be bent or angled relative to the central axis 120 of the rotor blade 100, such as by being bent or angled in a generally chordwise direction and/or in a generally flapwise direction. The chordwise direction generally corresponds to a direction parallel to the chord 122 and the flapwise direction generally corresponds to a direction perpendicular to the chord 122 and the span 118 (i.e., a direction extending between the pressure and suction sides 110, 112 of the rotor blade 100). For example, as shown in FIG. 2, the shell 108 may be bent or angled in the chordwise direction towards the trailing edge 116 of the rotor blade 100. In other embodiments, the shell 108 may be twisted in order to accommodate and/or take advantage of the aero-elastic effects occurring during operation, such as by twisting the shell 108 in a generally chordwise and/or flapwise direction. Additionally, in further embodiments, the shell 108 may be shaped, designed and/or otherwise configured in any other suitable manner that permits the shell 108 to provide a passive, aero-elastic response to bending and/or twisting of the blade 100.

It should be appreciated that, in alternative embodiments, the shell 108 need not be aero-elastically tailored. For example, as shown in FIG. 9, the shell 108 may be configured to along the central axis 120 of the rotor blade 100 between the blade tip 104 and the blade root 106 so as to form a conventional, straight rotor blade.

Further, the rotor blade 100 may also include a spar assembly 102 disposed within the shell 108. In general, the spar assembly 102 may serve as the primary structural element of the rotor blade 100 and, thus, may be configured to extend lengthwise within the shell 108 in order to provide structural support to the blade 100. For example, as shown in FIG. 2, the spar assembly 102 may extend longitudinally within the shell 108 substantially along the entire span 118 of the rotor blade 100, such as from generally adjacent the blade root 104 to generally adjacent the blade tip 106. However, in other embodiment, the spar assembly 102 may be configured to extend along only a portion of the span 118 of the rotor blade 100. Additionally, the spar assembly 102 may generally be configured to define a longitudinal profile conforming to the longitudinal profile of the portion of the rotor blade 100 within which the spar assembly 102 is disposed. For instance, in the illustrated embodiment, the spar assembly 102 may have a longitudinal profile generally conforming to the longitudinal profile of the aero-elastically tailored rotor blade 100, such as by defining a bent or angled profile extending towards the blade tip 106. However, it should be appreciated that, in alternative embodiments, the spar assembly 102 may define a generally straight longitudinal profile so as to conform to the profile of conventional, straight rotor blade.

As particularly shown in FIGS. 3 and 4, the illustrated spar assembly 102 may generally include a first spar cap 124, a second spar cap 126, and first and second shear webs 128, 130 extending outwardly from the first and second spar caps 124, 126. Each shear web 128, 130 may generally be configured to define a curved profile such that the shear webs 128, 130 extend outwardly from the spar caps 124, 126 at least partially in a chordwise direction. For example, the first shear web 128 may define a curved profile extending outwardly towards the leading edge 114 of the rotor blade 100 and the second shear web 130 may define a curved profile extending outwardly towards the trailing edge 116 of the rotor blade 100. As such, the spar assembly 102 may generally have a tubular configuration defining a closed, curved shape. For example, in several embodiments, the spar assembly 102 may define a generally elliptical shape. However, as will be described below with reference to FIGS. 6 and 7, the spar assembly 102 need not be configured to define such a closed shape. For instance, in alternative embodiments, the spar assembly 102 may only include a single curved shear web 128, 130 extending from the first and second spar caps 124, 126 such that the spar assembly has open configuration defining a generally semi-elliptical shape. It should be appreciated that, as used herein, the term "generally elliptical" means a circular or elliptical shape having a continuous or a substantially continuous curved profile. Similarly, the term "generally semi-elliptical" means a semi-circular or semi-elliptical shape having a continuous or substantially continuous profile.

In general, the first and second spar caps 124, 126 may be configured to be spaced apart from one another within the spar assembly 102. For example, as shown, the first and second spar caps 124, 126 may generally be positioned along the top and the bottom of the spar assembly 102, respectively. As such, when the spar assembly 102 is installed within the rotor blade 100, the first and second spar caps 124, 126 may generally be disposed adjacent to the opposed interior surfaces 132, 134 of the shell 108. For instance, the first spar cap 124 may be configured to be disposed generally adjacent to the interior surface 132 of the shell 108 defined on the suction side 112 of the rotor blade 100. Similarly, the second spar cap 126 may be configured to be disposed generally adjacent to the interior surface 134 of the shell 108 defined on the pressure side 134 of the rotor blade 100.

Due to such spacing between the first and second spar caps 124, 126, a cross-sectional area 136 may generally be defined directly between the spar caps 124, 126. In particular, a cross-sectional area 136 may be defined between the outermost chordwise points of each spar cap 124, 126, wherein the outermost chordwise points consist of the points on each spar cap 124, 126 disposed closest to the leading and trailing edges 114, 116 of the rotor blade 100. For instance, in the illustrated embodiment, the outermost points of the first and second spar caps 124, 126 may comprise the opposed end surfaces 138, 140 of each spar cap 124, 126. Thus, when straight lines 142 (shown as dashed lines) are connected between such end surfaces 138, 140, a definite cross-sectional area is defined between the lines 142 and the inner faces 144 of the spar caps 124, 126.

It should be appreciated that, due to the positioning of the first and second spar caps 124, 126 within the rotor blade 100, the spar caps 124, 126 may generally be configured to carry at least a portion of the flapwise loads acting on the blade 100. For example, as is generally understood, flapwise loading typically causes a rotor blade 100 to bend in a flapwise direction from the pressure side 110 to the suction side 112 and vice versa. Thus, by configuring the first and second spar caps 124, 126 to extend lengthwise along the interior surfaces 132, 134 of the shell 108, the spar caps 124, 126 may generally provide flapwise stiffness to the rotor blade 100 and resist such side-to-side bending.

It should also be appreciated that the first and second spar caps 124, 126 may generally define any suitable shape and may have any suitable dimensions that enable the spar caps 124, 126 to provide the desired flapwise stiffness to the rotor blade 100. For example, in the illustrated embodiment, the spar caps 124, 126 may generally define a substantially rectangular shape with the longest sides of the rectangular being oriented generally parallel to the interior surfaces 132, 134 of the shell 108. Alternatively, the spar caps 124, 126 may define any other suitable spar cap shape known in the art. Additionally, the first and second spar caps 124, 126 may generally be formed from any suitable material. For instance, in several embodiments, the spar caps 124, 126 may be formed from a composite laminate material, such as a carbon fiber-reinforced composite and/or a glass fiber-reinforced composite. Thus, in a particular embodiment, the first and second spar caps 124, 126 may be formed from a unidirectional composite having reinforcing fibers oriented longitudinally within the spar caps 124, 126. However, in further embodiments, the first and second spar caps 124, 126 may be formed from any other suitable materials, such as metals and the like.

Referring still to FIGS. 3 and 4, as indicated above, the shear webs 128, 130 of the spar assembly 102 may generally be configured to extend outwardly from the spar caps 124, 126 so as to define curved profiles between the spar caps 124, 126. For instance, in one embodiment, the first shear web 128 may include a first end 146 extending from an end surface 138 of the first spar cap 124 and a second end 148 extending from an end surface 138 of the second spar cap 126 such that a curved profile is defined between the spar caps 124, 126 that stretches outwardly in the direction of the leading edge 114 of the rotor blade 100. Similarly, the second shear web 130 may include a first end 146 extending from an end surface 140 of the first spar cap 124 and a second end 148 extending from an end surface 140 of the second spar cap 126 such that a curved profile is defined between the spar caps 124, 126 that stretches outwardly in the direction of the trailing edge 116 of the rotor blade 100.

It should be appreciated that curved profiles of the first and second shear webs 128, 130 may generally be configured to have any suitable shape and/or curvature that allows the shear webs 128, 130 to flex or otherwise provide a dynamic response to aerodynamic loads acting on the rotor blade 100. For example, in several embodiments of the present subject matter, each shear web 128, 130 may define a generally semi-elliptical profile between its ends 146, 148 such that the entire spar assembly 102 defines a generally elliptical shape. Accordingly, the spar assembly 102 may generally be provided with built-in flexibility as the shear webs 128, 130 may exhibit a variable spring rate through their curvature. Thus, when loading occurs on the rotor blade 100, the shear webs 128, 120 may flex or deflect outwardly in a generally chordwise direction, thereby effecting a softening of the rotor blade 100 (i.e., a reduction in stiffness) and increasing the rotor blade's ability to shed aerodynamic loads.

As shown, each shear web 128, 130 may generally include an ancillary spar cap 152 and a pair of arced segments 154, 156, with the combination of the ancillary spar cap 152 and the arced segments 156, 156 generally defining the curved profile of each web 128, 130. In particular, each shear web may include a first arced segment 154 disposed between the its first end 146 and the ancillary spar cap 152 and a second arced segment 156 disposed between the ancillary spar cap 152 and the its second end 148. As such, the ancillary spar cap 152 of each shear web 128, 130 may generally be spaced apart from the first and second spar caps 124, 126 in both the chordwise and flapwise directions. For instance, in the illustrated embodiment, the arced segments 154, 156 of each shear web 128, 130 may be configured such that the ancillary spar cap 152 is generally centrally located within each shear web 128, 130, such as by being disposed at the apex of the curved profile of each web 128, 130 (i.e., at the furthest chordwise location on the shear web 128, 130). Thus, the ancillary spar caps 152 and the first and second spar caps 124, 126 may generally be spaced apart ninety degrees from one another along the circumference of the spar assembly 102. As such, the ancillary spar caps 152 may be oriented substantially perpendicularly to the first and second spar caps 124, 126 and/or substantially perpendicularly to the chord 122 of the rotor blade 100. However, in alternative embodiments, it should be appreciated that the ancillary spar caps 152 need not be disposed at the locations shown in FIGS. 3 and 4 but may generally be disposed at any suitable location between the first and second ends 146, 148 of the shear webs 124, 126. Additionally, it should be appreciated that each shear web 128, 130 may include more than one ancillary spar cap 152. For example, two or more ancillary spar caps 128, 130 may be spaced apart along each shear web 128, 130.

By positioning the ancillary spar caps 152 within the shear webs 124, 126 as described above, the ancillary spar caps 152 may generally be configured to carry at least a portion of the edgewise loads acting on the blade 100. As is generally understood, edgewise loading typically cause the rotor blade 100 to deflect or move back-and-forth along the chord (i.e., from the leading edge 114 to the trailing edge 116 and vice versa). Thus, by configuring the ancillary spar caps 152 to extend within the spar assembly 102 at an orientation substantially perpendicular to the chord 122, the ancillary spar caps 152 may generally provide edgewise stiffness to the rotor blade 100 and resist such edge-to-edge bending.

It should be appreciated that the ancillary spar caps 152 may generally define any suitable shape and may have any suitable dimensions that enable the ancillary spar caps 152 to provide the desired flapwise stiffness to the rotor blade 100. For example, in one embodiment, the ancillary spar caps 152 may generally define a substantially rectangular shape with the longest sides of the rectangular being oriented generally perpendicular to the chord 122 of the rotor blade 100. Alternatively, the ancillary par caps 152 may define any other suitable spar cap shape known in the art. Additionally, the ancillary spar caps 152 may generally be formed from any suitable material. For instance, in several embodiments, the ancillary spar caps 152 may be formed from a composite laminate material, such as a carbon fiber-reinforced composite and/or a glass fiber-reinforced composite. Thus, in a particular embodiment, the ancillary spar caps 152 may be formed from a unidirectional composite having reinforcing fibers oriented longitudinally within the spar caps 152. However, in further embodiments, the ancillary spar caps 152 may be formed from any other suitable materials, such as metals and the like.

Moreover, it should be appreciated that the arced segments 154, 156 of the shear webs 128, 130 may generally define any suitable shape and may have any suitable dimensions that enable the spar assembly 102 to provide the desired stiffness to the rotor blade 100. For instance, as will be described below, the spar assembly 102 may include inner and outer skins 162, 164 (FIG. 4) adapted to carry at least a portion of the torsional loads acting on the rotor blade 100. Thus, the shape and/or thickness of the arced segments 154, 156 may be designed such that the portions of the inner and outer skins 162, 164 disposed along the arced segments 154, 156 may effectively increase the torsional stiffness of the rotor blade 100. Additionally, the arced segments 154, 156 may generally be formed from any suitable material. For example, the arced segments 154, 156 may be formed from a low-density, lightweight core material. Thus, in several embodiments, the arced segments 154, 156 may comprise a curved mass of foam material (e.g., expanded polystyrene foam (EPS) and other suitable closed and open cell foams), balsa wood, cork and the like. Alternatively, the arced segments 154, 156 may comprise various other suitable materials. For instance, the arced segments 154, 156 may be formed entirely from a composite laminate material, such as a carbon fiber-reinforced composite and/or a glass fiber-reinforced composite. In such an embodiment, it may be desirable to include a stiffener element running longitudinally along the arced segments 154, 156 to provide additional stiffness to the spar assembly 102. In another embodiment, the arced segments 154, 156 may be formed from a combination of a composite laminate material and another material, such as the core material described above.

Further, in several embodiments of the present subject matter, the first and second shear webs 128, 130 may be configured to extend outwardly from the first and second spar caps 124, 126 such that at least a portion of an inner surface 158 of each shear web 128, 130 is disposed outside the cross-sectional area 136 defined between the spar caps 124, 126. For example, in the illustrated embodiment, the arced segments 154, 156 of the shear webs 128, 130 may be configured to extend outwardly from the end surfaces 138, 140 of each spar cap 124, 126 such that the entirety of each shear web 128, 130 is disposed outside the cross-sectional area 136. In other embodiments, the arced segments 154, 156 may be configured to extend from a location other than the end surfaces 138, 140 of the spar caps 124, 126. For instance, the arced segments 154, 156 may be configured to extend from the inner faces 144 of the spar caps 124, 126. In such an embodiment, similar to the embodiment described below with reference to FIG. 7, the curved profiles of the shear webs 128, 130 may be configured such that a substantial portion of the inner surface 158 of each shear web 128, 130 extends outside of the defined the cross-sectional area 136. However, in alternative embodiments, it should be appreciated that the first and second shear webs 128, 130 need not define a curved profile extending outwardly from the spar caps 124, 126 such that at least a portion of the inner surfaces 158 of the shear webs 128, 130 are disposed outside the cross-sectional area 136. For instance, in one embodiment, the shear webs 128, 130 may be configured to define a curved profile extending between the spar caps 124, 126 such that the entirety of the inner surfaces 158 of each shear web 128, 130 is disposed within the cross-sectional area 136.

Referring particularly now to FIG. 4, the disclosed spar assembly 102 may also include an inner skin 162 and an outer skin 164 disposed around the inner and outer perimeters of the spar assembly 102, respectively. In particular, the inner skin 162 may extend around the inner perimeter of the spar assembly 102 so as to encompass the inner faces 144 of the first and second spar caps 124, 126 and the inner surfaces 158 of the first and second shear webs 128, 130. As such, the inner skin 162 may generally define the inner surface of the spar assembly 102. Similarly, the outer skin 164 may extend around the outer perimeter of the spar assembly 102 and may encompass the outer faces 166 of the first and second spar caps 124, 126 and the outer surfaces 168 of the first and second shear webs 128, 130 so as to define the outer surface of the spar assembly 102.

It should be appreciated that the inner and outer skins 162, 164 of the spar assembly 102 may generally be formed from any suitable material. For example, the skins 162, 164 may be formed from a composite laminate material, such as a carbon fiber-reinforced composite and/or a glass fiber-reinforced composite. Thus, in several embodiments of the present subject matter, the inner and outer skins 162, 164 may be formed from a composite laminate having overlapping layers of biaxial and unidirectional plies.

It should also be appreciated that, by covering the first and second spar caps 124, 126 and the first and second shear webs 128, 130 with the inner and outer skins 162, 164, numerous advantages may be provided to the disclosed spar assembly 102. For example, the inner and outer skins 162, 164 may provide additional flapwise and edgewise stiffness to the rotor blade 100. This may be particularly true when the skins 162, 164 are at least partially formed from unidirectional plies, as the additional unidirectional material provided adjacent to the first and second spar caps 124, 126 and/or the ancillary spar caps 152 may serve to carry a portion of the flapwise and edgewise loads. Moreover, by encompassing the curved shape of the spar assembly 102 with the inner and outer skins 162, 164, the skins 162, 164 may also carry the torsional loads acting on the rotor blade 100. As is generally understood, torsional loading typically causes the rotor blade 100 to twist about its central axis 120. Thus, the inner and outer skins 162, 164 may generally increase the torsional stiffness of the spar assembly 102 along its curve shape, thereby improving the rotor blade's ability to shed torsional loads through the spar assembly 102.

As indicated above, the components of the spar assembly 102 may generally be divorced from the shell 108 of the rotor blade 100. Thus, it should be appreciated that the spar assembly 102 may generally be manufactured as a stand-alone component of the rotor blade 100. As such, the spar assembly 102 may generally be configured to separately attached to the shell 108 using any suitable means known in the art. For instance, the outer skin 162 of the spar assembly 102 may be bonded to the interior surfaces 132, 134 of the shell 108 using suitable adhesives. In another embodiment, the spar assembly 102 may be attached to the shell 108 using suitable mechanical fasteners, such as screws, bolts, pins, rivets and/or any other suitable fasteners. Moreover, in alternative embodiments, the spar assembly 102 may configured to be recessed or infused into the shell 108. For example, in a particular embodiment of the present subject matter, the first and second spar caps 124, 126 may be infused into the shell 108.

It should also be appreciated that the disclosed spar assembly 102 may generally be manufactured using any suitable means. For example, in one embodiment, the spar assembly 102 may be molded using a mold having a shape corresponding to the desired shape of the spar assembly 102 such that the various components of the assembly 102 may be laid up together around the mold. In such an embodiment, the inner and outer skins 162, 164 may be formed using a continuous winding and/or tape laying process, which may greatly reduce the time required to form the entire spar assembly 102.

In another embodiment, the tubular configuration of the spar assembly 102 may be formed from multiple pieces. For instance, similar to the shell 108 of the rotor blade 100, the spar assembly 102 may be formed in halves (not shown), such as along the dashed joint lines shown in FIG. 3, with corresponding molds being utilized to form the spar assembly halves. The spar assembly halves may then be secured to one another to form the closed shape of the spar assembly 102. For example, FIG. 5 illustrates one embodiment of a joint configuration that may be used to attach spar assembly halves to one another. As shown, the ends 172 of the spar assembly halves may be configured to have corresponding tapered or scarfed profiles, such as mold controlled tapered or scarfed edges having a taper ratio of about 40:1 to about 90:1, such as from about 50:1 to about 80:1 or from about 60:1 to about 80:1 and all other subranges therebetween. A suitable adhesive 174 may then be injected or otherwise inserted between the ends 172 to bond the ends halves together. Additionally, several laminate plies 176 may be applied over the joint formed at the ends 172 to ensure proper attachment of the spar assembly halves. However, it should be appreciated that, in alternative embodiments, any other suitable joint configuration may be utilized to attach the spar assembly halves to one another. For instance, the ends 172 of the spar assembly halves may be configured to form a lap joint, a butt joint or any other suitable joint known in the art.

Additionally, in several embodiment of the present subject matter, the spar assembly 102 may be segmented along its length. For example, the spar assembly 102 may include a plurality of longitudinal segments (not shown) configured to be attached to one another to from the entire spar assembly 102. In such an embodiment, the longitudinal segments may generally be attached to one another using any suitable means. For instance, the longitudinal segments may define corresponding tapered or scarfed ends that permit the segments to be secured together similar to that shown in FIG. 5. Alternatively, the longitudinal segments may be configured to have any other suitable joint configuration, such as by having ends configured to form lap joints, butt joints or any other suitable joints known in the art.

By segmenting the spar assembly 102, it should be appreciated that numerous advantages may be provided. For instance, the longitudinal segments of the spar assembly 102 may be configured to be assembled in the field, thereby enhancing the transportability of the spar assembly 102. Additionally, a segmented spar assembly design may be advantageously used with modularly constructed rotor blades. For example, the longitudinal segments of the spar assembly 102 and the various components of the modular rotor blade may all be quickly and easily assembly together in the field.

Referring now to FIG. 6, there is illustrated a cross-sectional view of another embodiment of a spar assembly 202 suitable for use with the disclosed rotor blade 100 in accordance with aspects of the present subject matter. In general, the illustrated spar assembly 202 may be configured similarly to the spar assembly 102 described above with reference to FIGS. 3 and 5 and may include many of the same or similar components as those described above. For example, the spar assembly 202 may include first and second spar caps 224, 226 and a shear web 228 extending from the spar caps 224, 226 and including an ancillary spar cap 252 and arced segments 254, 256. Additionally, the spar assembly 102 may include an inner and outer skin 162, 164 (FIG. 4) covering the spar caps 224, 226 and the shear web 228.

However, unlike the above described embodiment, the spar assembly 202 may only include a single shear web 228 extending outwardly from the first and second spar caps 224, 226. For example, as shown, the shear web 228 may be configured to extend outwardly from the end surfaces 238 of the spar caps 224, 226 such that the entire web 228 is disposed outside the cross-sectional area 236 defined between the spar caps 224, 226. Additionally, the shear web 228 may generally be configured to define a curved profile between its first and second ends 246, 248. For instance, in several embodiments, the shear web 228 may define a generally semi-elliptical curved profile. As such, the entire spar assembly 202 may have an open or "C" shaped configuration defining a generally semi-elliptical shape. It should be appreciated that, although the shear web 28 is shown as being curved in the direction of the leading edge 114 of the rotor blade 100, the shear web 228 may also be configured to extend from the opposing end surfaces 240 of the spar caps 224, 226 such that the shear web 228 curved outwardly in the direction of the trailing edge 116 of the rotor blade 100.

Similar to the spar assembly 102 described above, it should be appreciated that the illustrated spar assembly 202 may be configured to carry the aerodynamic loads acting on the rotor blade 100. For example, the first and second spar caps 224, 226 and the ancillary spar cap 252 may be adapted to carry at least a portion of the flapwise and edgewise loads acting on the blade 100, respectively. Additionally, the inner and outer skin 162, 164 (FIG. 4) surrounding the first and second spar caps 224, 226 and the shear web 228 may carry the torsional loads acting on the blade 100, as well as a portion of the flapwise and edgewise loads. Moreover, due to the curved profile of the shear web 228, the spar assembly 202 may provide variable stiffness to the rotor blade 100 as the shear web 228 flexes or deflects in a generally chordwise direction in response to blade loading. As such, the deflection of the rotor blade 100 may be controlled so as to enhance rotor blade's ability to shed its aerodynamic loads.

Furthermore, by configuring the spar assembly 202 to have an open-shaped configuration instead of the tubular configuration described above, the spar assembly 202 may be capable of twisting in response to torsional loading on the rotor blade 100. In particular, the open-shaped configuration may result in the mass and shear centers of the spar assembly 202 being offset, thereby allowing the spar assembly 202 to naturally twist. As such, the spar assembly 202 may provide a natural aero-elastically tailored effect to the rotor blade 100.

Referring now to FIG. 7, there is illustrated a cross-sectional view of a further embodiment of a spar assembly 302 suitable for use with the disclosed rotor blade 100 in accordance with aspects of the present subject matter. In general, the illustrated spar assembly 302 may be configured similar to the spar assemblies 102, 202 described above with reference to FIGS. 3, 4 and 6 and may include many of the same or similar components as those described above. For example, the spar assembly 302 may include first and second spar caps 324, 326 and a shear web 328 extending from the spar caps 324, 326 and including an ancillary spar cap 352 and arced segments 354, 356. Additionally, the spar assembly 302 may include an inner and outer skin 162, 164 (FIG. 4) covering the spar caps 324, 326 and the shear web 328.

In particular, similar to the embodiment described above with reference to FIG. 6, the shear web 328 of the spar assembly 302 may be configured to extend outwardly from the spar caps 324, 326 in the direction of the leading edge 114 or the trailing edge 116 of the rotor blade 100 so as to define a curved profile. For instance, the shear web 328 may define a generally semi-elliptical curved profile such that the entire spar assembly 302 has an open or "C" shaped configuration defining a generally semi-elliptical shape. However, unlike the spar assembly 202 described above, the first and second ends 346, 348 of the shear web 328 may be configured to extend outwardly from the inner faces 344 of the first and second spar caps 324, 326. As such, at least a portion of the shear web 328 may be disposed within the cross-sectional area 336 defined between the first and second spar caps 324, 326. For example, in the illustrated embodiment, the shear web 328 may extend outwardly from the inner faces 344 such that only a small portion of the shear web 328 is disposed within the cross-sectional area 336. Alternatively, the radius of curvature of the shear web 328 may be increased such that a substantial portion or the entire shear web 328 is disposed within the cross-sectional area 336.

It should be appreciated that, similar to the spar assemblies 102, 202 described above, the illustrated spar assembly 302 may be configured to carry the aerodynamic loads acting on the rotor blade. For example, the first and second spar caps 324, 326 and the ancillary spar cap 328 may be adapted to carry at least a portion of the flapwise and edgewise loads acting on the rotor blade 100, respectively. Additionally, the inner and outer skins 162, 164 (FIG. 4) surrounding the first and second spar caps 324, 326 and the shear web 328 may carry the torsional loads acting on the rotor blade 100, as well as a portion of the flapwise and edgewise loads. Moreover, due to the curved profile of the shear web 328, the spar assembly 302 may provide variable stiffness to the rotor blade 100 as the shear web 328 flexes or deflects in a generally chordwise direction in response to blade loading. As such, the deflection of the rotor blade 100 may be controlled so as to enhance rotor blade's ability to shed its aerodynamic loads.

Furthermore, by configuring the spar assembly 302 to have an open-shaped configuration instead of the tubular configuration described above, the spar assembly 302 may be capable of twisting in response to torsional loading on the rotor blade 100. In particular, the open-shaped configuration may result in the mass and shear centers of the spar assembly 302 being offset, thereby allowing the spar assembly 302 to naturally twist. As such, the spar assembly 302 may provide a natural aero-elastically tailored effect to the rotor blade.

It should also be appreciated that, with any of the embodiments described above with reference to FIGS. 3-7, one or more perpendicularly extending shear webs (not shown) may also be included, if necessary, to provide additional stiffness to the rotor blade 100. For example, in the embodiment shown in FIGS. 3 and 4, the spar assembly 102 may include a rigid shear web extending perpendicularly between the first and second spar caps 124, 126. In such an embodiment, the perpendicularly extending shear web may also include an auxiliary spar cap similar to those described above. Moreover, in addition to a perpendicularly extending shear web or as an alternative thereto, the spar assembly 102 may also include one or more angled shear webs extending between one or more of the arced segment 154, 156 of one of the shear webs 128, 130 to one or more of the arced segments 154, 156 of the other shear web 128, 130.

Referring now to FIG. 8, there is illustrated a cross-sectional view of one embodiment of a rotor blade 100 having a primary spar assembly 402 and an auxiliary spar assembly 478 in accordance with aspects of the present subject matter. As shown, the primary spar assembly 402 may generally be configured the same as the spar assembly 102 described above with reference to FIGS. 3 and 4. Thus, the primary spar assembly 402 may generally have a tubular configuration and may include first and second spar caps 424, 426, first and second shear webs 428, 430 (with each having an ancillary spar cap 452 and arced segments 454, 465). Additionally, the primary spar assembly 402 may include an inner and outer skin 162, 164 (FIG. 4) covering the spar caps 424, 426 and the shear webs 428, 430.

In general, the auxiliary spar assembly 478 may be configured to be spaced apart from the primary spar assembly 402 within the blade shell 108. For example, as shown, the auxiliary spar assembly 478 may be spaced apart from the primary spar assembly 502 in the direction of the trailing edge 114 of the rotor blade 100. Additionally, in several embodiments, the auxiliary spar assembly 478 may include a first spar cap 479, a second spar cap 480 and a jointed or hinged shear web 481 extending between the first and second spar caps 479, 480. The spar caps 479, 480 of the auxiliary spar assembly 478 may generally be configured the same as the first and second spar caps 124, 126 described above with reference to FIGS. 3 and 4. Thus, the first spar cap 479 may be configured to be disposed generally adjacent to the interior surface 132 of the blade shell 108 defined on the suction side 112 of the rotor blade 100 and the second spar cap 480 may be configured to be disposed generally adjacent to the interior surface 134 of the blade shell 108 defined on the pressure side 110 of the rotor blade 100. As such, the spar caps 479, 480 may be configured to carry at least a portion of the flapwise loads acting on the rotor blade 100.

As indicated above, the hinged shear web 481 of the auxiliary spar assembly 478 may generally be configured to extend between the first and second spar caps 479, 480. Thus, the hinged shear web 481 may include a first end 482 disposed adjacent to the first spar cap 479 and a second end 483 disposed adjacent to the second spar cap 480. Additionally, in several embodiments of the present subject matter, the hinged shear web 481 may be configured to extend from each of the first and second spar caps 479, 480 at a chordwise angle 484. By "chordwise angle," it is meant that the hinged shear web 481 extends from each spar cap 479, 480 at an angle other than 90 degrees such that a portion of the hinged shear web 481 is oriented in the chordwise direction. For example, in the illustrated embodiment, an obtuse angle may be defined between the inner surface 485 of the shear web 481 and the inner faces 486 of the first and second spar caps 479, 480 such that the hinged shear web 481 extends at least partially in the chordwise direction towards the leading edge 114 of the rotor blade 100. However, in alternative embodiments, the hinged shear web 481 may be oriented relative to the spar caps 479, 480 such that the shear web 481 extends outwardly towards the trailing edge 116 of the rotor blade 100. Moreover, in further embodiments, the hinged shear web 481 may be configured to extend perpendicularly from each spar cap 479, 480.

Additionally, the hinged shear web 481 may include a hinge feature 487 configured to remove a degree of freedom of movement from the shear web 481. In several embodiments, the hinge feature 487 may be formed integrally with the shear web 481. For example, the hinge feature 487 may comprise an opening or other discontinuity defined in the shear web 481. Thus, as shown in 8, an opening 488 may be defined through the center of the shear web 481 and may extend longitudinally along the auxiliary spar assembly 478 so as to create a hinge-like feature within the shear web 481. In alternative embodiments, the hinge feature 487 may comprise a separate component configured to be assembled into or onto the shear web 381. For example, in one embodiment, the hinge feature 487 may comprise a mechanical hinge or any other suitable pivotal attachment mechanism. In such an embodiment, the hinged shear web 481 may generally be formed from separate shear web sections (not shown) joined together using the hinge feature 487.

It should be appreciated that the hinged shear web 481 may generally provide variable stiffness to the rotor blade 100 by removing the ability of the auxiliary spar assembly 478 to carry edgewise loads. In other words, the hinged shear web 481 may effect a softening of the rotor blade 100, thereby permitting the deflection of the rotor blade 100 to be increased in a controlled manner. Additionally, the hinged configuration of the auxiliary spar assembly 478 may permit the first and second spar caps 479, 480 to rotate. As such, the rotor blade's ability to shed its aerodynamic loads and accommodate twisting may be significantly enhanced.

It should also be appreciated that, although the hinged shear web 481 is described above as being utilized in an auxiliary spar assembly, such a hinged configuration may also be used in a primary spar assembly. Similarly, it should be appreciated that tubular spar assembly 102 described above with reference to FIGS. 3 and 4 and the open-shaped spar assemblies described above with reference to FIGS. 6 and 7 may be configured as primary spar assemblies or as auxiliary spar assemblies. Thus, the disclosed rotor blade 100 may include any combination of spar assembly configurations as its primary and auxiliary spar assemblies.

Referring now to FIG. 9, there is illustrated a perspective view of another embodiment of a rotor blade 500 having a spar assembly 502 disposed therein in accordance with aspects of the present subject matter. In general, the rotor blade 500 may include a blade root 504 configured for mounting the rotor blade 500 to a hub 18 of a wind turbine hub 10 (FIG. 1) and a blade tip 506 disposed opposite the blade root 504. The rotor blade may also include a shell 508 extending between the blade root 504 and the blade tip 506. The shell 508 may generally serve as the outer skin of the rotor blade 500 and, thus, may define a substantially aerodynamic profile. For instance, the shell 508 may be configured to have an airfoil-shaped cross-section, such as by being configured as symmetrical airfoil or a cambered airfoil and may define a suction side 512 and a pressure side (not shown) extending between leading and trailing edges 514, 516. Further, the rotor blade 500 may also have a span 518 defining the length of the blade 500 between the blade root 504 and the blade tip 506 and a chord 522 defining the total length of the blade 500 between the leading edge 514 and the trailing edge 516.

Additionally, the rotor blade 500 may include a spar assembly 502 extending longitudinally within the blade shell 506. As shown, the spar assembly 502 may generally be designed to have varying configurations along the span 518 of the rotor blade 500. In particular, the spar assembly 502 may include a first portion 590 extending a first distance 591 along the span 518 of the rotor blade 500 to a transition point 592 and a second portion 593 extending from the transition point 592 a second distance 594. For example, in the illustrated embodiment, the first portion 590 of the spar assembly 502 may be configured similarly to the spar assembly 102 described above with reference to FIGS. 3 and 4 and may generally have tubular configuration extending from generally adjacent the blade root 504 to the transition point 592. Additionally, the second portion 591 of the spar assembly 502 may be configured similarly to one of the spar assemblies 202, 302 described above with reference to FIGS. 6 and 7 and may have an open or "C" shaped configuration extending from the transition point 592 towards the blade tip 506. However, in alternative embodiments, it should be appreciated that the spar assembly 502 may have any other combination of spar assembly configurations described herein.

It should also be appreciated that the transition point 592 of the spar assembly 502 may generally be defined at any suitable location along the span 518 of the rotor blade 500. However, in the illustrated embodiment, it may be desirable for the transition point 592 to be defined at an outboard location of the rotor blade 500 (e.g., at a length from the blade root 504 greater than or equal to 50% of the span 518). For example, it may be desirable for the rotor blade 500 to be able to twist at its outboard locations, which may be particularly true for aero-elastically tailored rotor blades. In contrast, such twisting may be undesirable at locations disposed further inboard where the aerodynamic loads acting on the rotor blade 500 are higher. Thus, by configuring the spar assembly 502 to transition from a tubular configuration to an open shaped configurations, the spar assembly 502 may be capable of providing sufficient torsional stiffness at the inboard locations of the rotor blade 500 and may also be capable of accommodating and/or inducing twisting of the rotor blade 500 at the outboard locations due to the offset mass and shear centers of the open shaped design.

Further, although the transition point 592 between the first portion 590 and the second portion 593 is shown in FIG. 8 as being substantially sharp, the transition point 592 may also be curved. For example a radius may be defined at the transition point 592 to allow enhanced load transfer between the first and second portions 590. 593.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spar assembly for a rotor blade of a wind turbine, the spar assembly comprising:
a first spar cap;
a second spar cap spaced apart from said first spar cap such that a cross-sectional area is defined directly between said first and second spar caps; and,
a web having a first end disposed adjacent to said first spar cap and a second end disposed adjacent to second spar cap, said web comprising at least one ancillary spar cap between said first and second ends,
wherein at least a portion of an inner surface of said web is disposed outside of said cross-sectional area.

2. The spar assembly of claim 1, wherein said web defines a generally semi-elliptical cross-sectional shape.

3. The spar assembly of claim 1, wherein said at least one ancillary spar cap is oriented substantially perpendicularly to said first and second spar caps.

4. The spar assembly of claim 1, wherein said web further comprises a first arced segment extending between said first end and said at least one ancillary spar cap and a second arced segment extending between said at least one ancillary spar cap and said second end.

5. The spar assembly of claim 4, wherein said first and second arced segments are formed from a core material.

6. The spar assembly of claim 1, further comprising an inner skin defining an inner surface of the spar assembly and an outer skin defining an outer surface of the spar assembly.

7. The spar assembly of claim 1, wherein said web comprises a first web configured to extend outwardly in a direction of a leading edge of the rotor blade and a second web configured to extend outwardly in a direction of a trailing edge of the rotor blade, an inner surface of each of said first and second curved webs being disposed outside of said cross-sectional area.

8. The spar assembly of claim 7, wherein said first and second webs each include at least one ancillary spar cap.

9. The spar assembly of claim 7, wherein said first and second webs extend from said first and second spar caps such that the spar assembly defines a generally elliptical cross-sectional shape.

10. A rotor blade for a wind turbine, the rotor blade comprising:
a shell including a first interior surface and a second interior surface disposed opposite of said first interior surface; and,
a spar assembly, comprising:
a first spar cap disposed adjacent to said first interior surface;
a second spar cap disposed adjacent to said second interior surface, said second spar cap being spaced apart from said first spar cap such that a cross-sectional area is defined directly between said first and second spar caps; and,
a web having a first end deposed adjacent to said first spar cap and a second end disposed adjacent to said second spar cap, said web comprising at least one ancillary spar cap between said first and second ends,
wherein at least a portion of an inner surface of said web is disposed outside of said cross-sectional area.

11. The rotor blade of claim 10, wherein said web comprises a first web configured to extend outwardly in a direction of a leading edge of the rotor blade and a second web configured to extend outwardly in a direction of a trailing edge of the rotor blade, an inner surface of each of said first and second webs being disposed outside of said cross-sectional area.

12. The rotor blade of claim 11, wherein said first and second webs each include at least one ancillary spar cap.

13. The rotor blade of claim 12, wherein said at least one ancillary spar cap is oriented substantially perpendicularly to said first and second spar caps.

14. The rotor blade of claim 12, wherein said first and second webs each include a first arced segment extending between said first end and said at least one ancillary spar cap and a second arced segment extending between said at least one ancillary spar cap and said second end.

15. The rotor blade of claim 11, wherein said first and second webs extend from said first and second spar caps such that said spar assembly defines a generally elliptical cross-sectional shape.

16. The rotor blade of claim 15, wherein said spar assembly transitions from said generally elliptical cross-sectional shape to a generally semi-elliptical cross-sectional shape at a transition point along the span of the rotor blade.

* * * * *